US012789579B2

(12) United States Patent
Tokuda et al.

(10) Patent No.: US 12,789,579 B2
(45) Date of Patent: Nov. 10, 2026

(54) OFF-ROAD VEHICLE

(71) Applicant: KAWASAKI MOTORS, LTD., Akashi (JP)

(72) Inventors: Jumpei Tokuda, Akashi (JP); Sota Tsurumi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 310 days.

(21) Appl. No.: 18/434,925

(22) Filed: Feb. 7, 2024

(65) Prior Publication Data

US 2025/0249722 A1 Aug. 7, 2025

(51) Int. Cl.
*B60H 1/00* (2006.01)

(52) U.S. Cl.
CPC ..... *B60H 1/00407* (2013.01); *B60H 1/00028* (2013.01); *B60H 1/00207* (2013.01); *B60H 2001/00214* (2013.01)

(58) Field of Classification Search
CPC ............ B60H 1/00407; B60H 1/00028; B60H 1/00207; B60H 2001/00214; B60H 1/00021
See application file for complete search history.

(56) References Cited

U.S. PATENT DOCUMENTS

| | | | | |
|---|---|---|---|---|
| 5,222,372 | A * | 6/1993 | DeRees | B60H 1/00264 62/323.3 |
| 11,794,822 | B2 * | 10/2023 | Schounard | B62D 21/183 |
| 2008/0032618 | A1 * | 2/2008 | Katoh | B60H 1/00564 454/143 |
| 2012/0247747 | A1 * | 10/2012 | DiGasbarro | B60H 1/00028 165/122 |
| 2018/0086180 | A1 | 3/2018 | Herrmann et al. | |
| 2018/0345751 | A1 * | 12/2018 | Thawani | B60H 1/00021 |
| 2022/0072929 | A1 * | 3/2022 | Gordon | B60H 1/3229 |
| 2022/0097549 | A1 * | 3/2022 | Oishi | B60L 53/14 |
| 2022/0242508 | A1 * | 8/2022 | Yamamoto | B60N 2/015 |
| 2022/0314750 | A1 * | 10/2022 | Lee | B60H 1/00514 |

* cited by examiner

*Primary Examiner* — Taras P Bemko
(74) *Attorney, Agent, or Firm* — XSENSUS LLP

(57) ABSTRACT

An off-road vehicle includes: a dash panel separating a cabin space and a front space; a dashboard located behind the dash panel and facing an occupant seat; a front panel located in front of the dash panel; and an air conditioner located in an accommodating space defined between the dash panel and the dashboard. An outside air suction port of the air conditioner is located in an intake space that is covered with the dash panel from a rear side and is covered with the front panel from a front side.

19 Claims, 8 Drawing Sheets

OFF-ROAD VEHICLE

BACKGROUND OF THE INVENTION

Field of the Invention

The present disclosure relates to an off-road vehicle including an air conditioner.

Description of the Related Art

US 2018/0086180 A1 discloses an air conditioning system of an off-road vehicle. The air conditioning system includes an air conditioning unit and a blower unit. The air conditioning unit is located in front of a cabin space. The off-road vehicle travels on a waste land. Therefore, when the air conditioning unit sucks outside air, dust and water are desired to be prevented from being sucked into the air conditioning unit.

SUMMARY OF THE INVENTION

An off-road vehicle according to one aspect of the present disclosure includes: a vehicle body frame; a cabin space where an occupant seat supported by the vehicle body frame is located; a front cover covering, from an upper side, a front space located in front of the cabin space; a dash panel separating the cabin space and the front space; a dashboard located behind the dash panel and facing the occupant seat; a front panel located in front of the dash panel; and an air conditioner located in an accommodating space defined between the dash panel and the dashboard. An outside air suction port of the air conditioner is located in an intake space that is covered with the dash panel from a rear side and is covered with the front panel from a front side.

DETAILED DESCRIPTION

Hereinafter, an embodiment will be described with reference to the drawings. Directions in the following description are based on directions of an off-road vehicle 1 unless otherwise specified. A front-rear direction corresponds to a vehicle longitudinal direction, and a left-right direction corresponds to a vehicle width direction.

Figure 1:
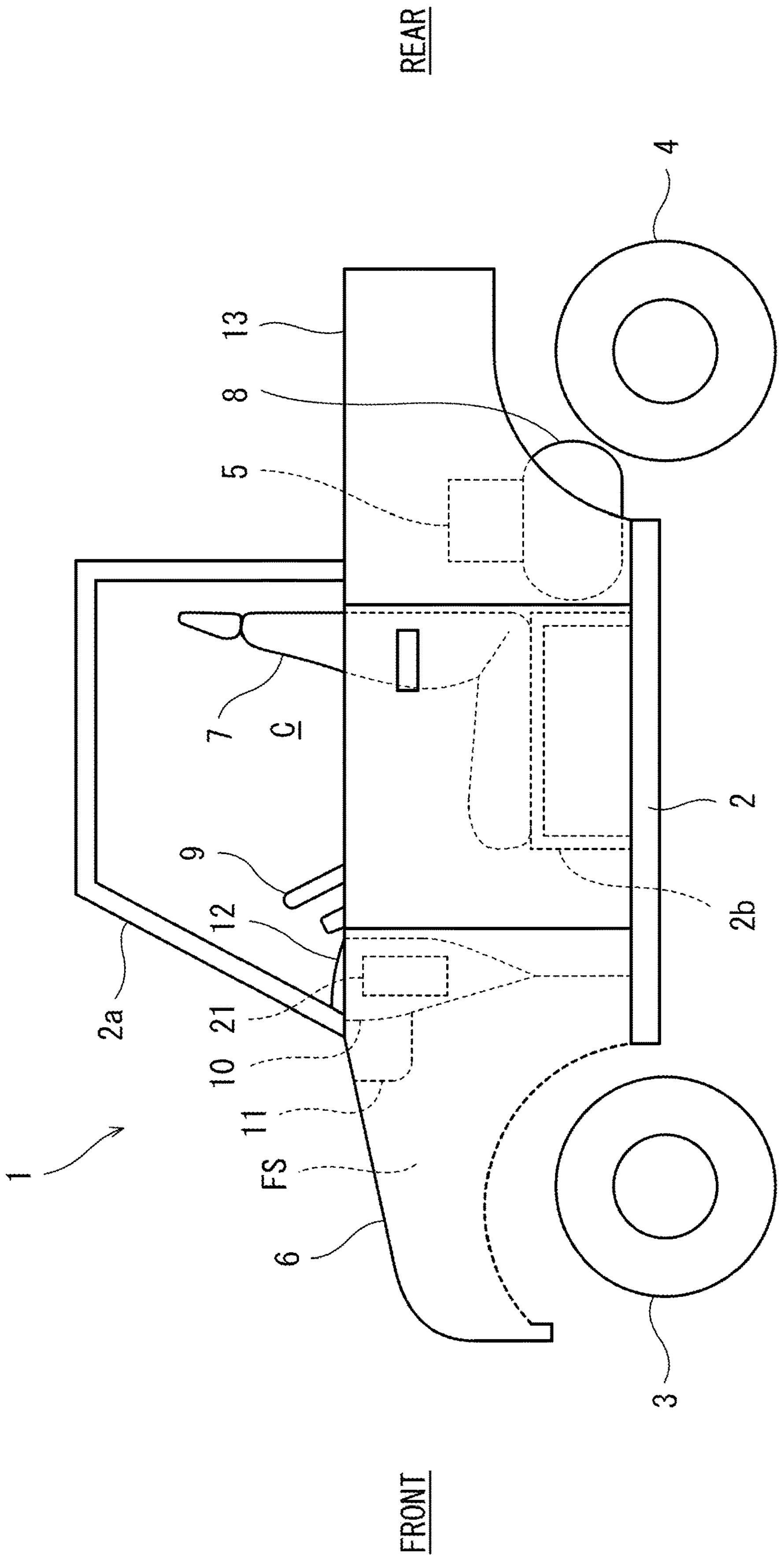
FIG. 1 is a left side view of an off-road vehicle according to an embodiment.

FIG. 1 is a left side view of the off-road vehicle 1 according to the embodiment. As shown in FIG. 1, the off-road vehicle 1 includes: a vehicle body frame 2; a pair of front wheels 3 that are left and right front wheels supporting a front portion of the vehicle body frame 2; and a pair of rear wheels 4 that are left and right rear wheels supporting a rear portion of the vehicle body frame 2. Tires of the front wheels 3 and the rear wheels 4 are, for example, balloon tires for uneven ground traveling. The off-road vehicle 1 may also be called a utility vehicle. A front cover 6 is located in a front space FS between the left and right front wheels 3. The front space FS is covered with the front cover 6 from an upper side. Occupant seats 7 supported by the vehicle body frame 2 are located side by side behind the front cover 6.

The vehicle body frame 2 is a pipe frame including pipes connected to each other. The vehicle body frame 2 includes, for example, a cabin frame 2*a* defining a cabin space C. The front cover 6 supported by the vehicle body frame 2 is located in front of the cabin space C. Entrances which are opened or closed by side doors are open at both lateral sides of the cabin space C.

A dash panel 10 that separates the front space FS and the cabin space C is supported by the vehicle body frame 2. A front panel 11 is located in front of an upper portion of the dash panel 10. A dashboard 12 is located behind the dash panel 10 and in front of the occupant seats 7. A steering wheel 9 operated by a driver is located at the dashboard 12. A below-described air conditioner 21 is located between the dash panel 10 and the dashboard 12.

A cargo bed 13 defining a hollow loading space that is open upward to an outside is located behind the cabin frame 2*a*. An internal combustion engine 5 and a continuously variable transmission 8 which are supported by the vehicle body frame 2 are located behind the occupant seats 7 and under the cargo bed 13. The continuously variable transmission 8 is adjacent to the internal combustion engine 5 and changes the rotational speed of the driving power output by the internal combustion engine 5. The driving power output from the continuously variable transmission 8 is transmitted to the front wheels 3 or the rear wheels 4 or to both of the front wheels 3 and the rear wheels 4.

Figure 2:
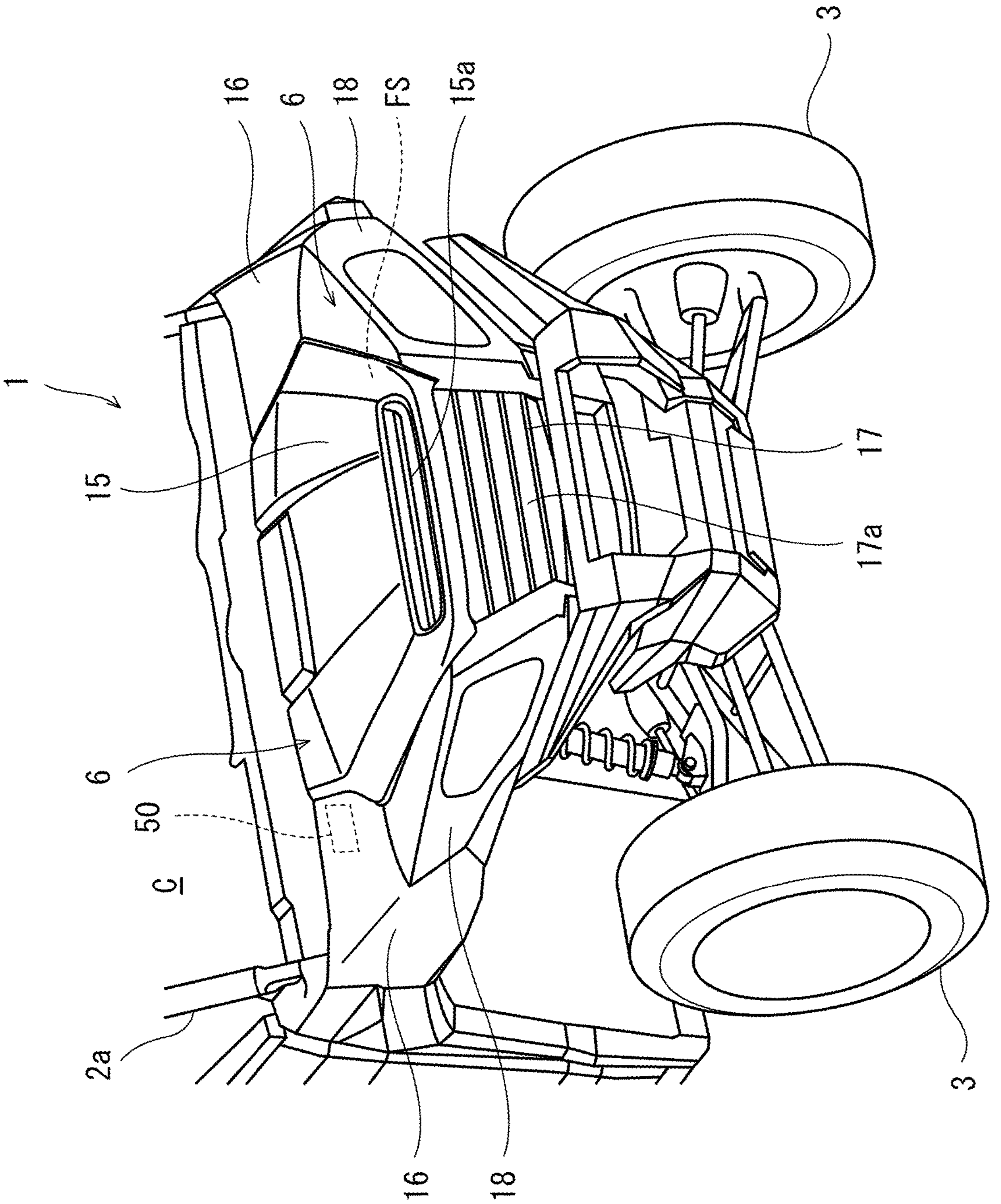
FIG. 2 is a perspective view of a front portion of the vehicle of FIG. 1.

FIG. 2 is a perspective view of a front portion of the off-road vehicle 1 of FIG. 1. As shown in FIG. 2, the front portion of the off-road vehicle 1 includes the front cover 6 that at least partially covers the front space FS from the upper side. The front cover 6 includes an outer surface that is exposed to an outside of the vehicle. The front cover 6 includes a hood 15 and front side cowls 16 located at right and left sides of the hood 15. A front grill 17 is located in front of the hood 15.

The hood 15 includes an outer surface that is exposed to the outside of the vehicle. The hood 15 at least partially covers the front space FS from the upper side. The hood 15 is located at a middle in the vehicle width direction. A front portion of the hood 15 includes a front opening 15*a* through which traveling wind from a front side is guided to the front space FS. While the off-road vehicle 1 is traveling, air flows through the front opening 15*a* of the hood 15 into a space under the hood 15. Each of the front side cowls 16 includes an outer surface exposed to the outside of the vehicle. The front side cowls 16 are adjacent to the hood 15 from the lateral sides. Each front side cowl 16 at least partially covers the front space FS from the upper side and the lateral side. The front side cowls 16 are adjacent to head light units 18 from a rear side. The front grill 17 includes air guide holes 17*a* through which the traveling wind from the front side is guided to the front space FS.

Figure 3:
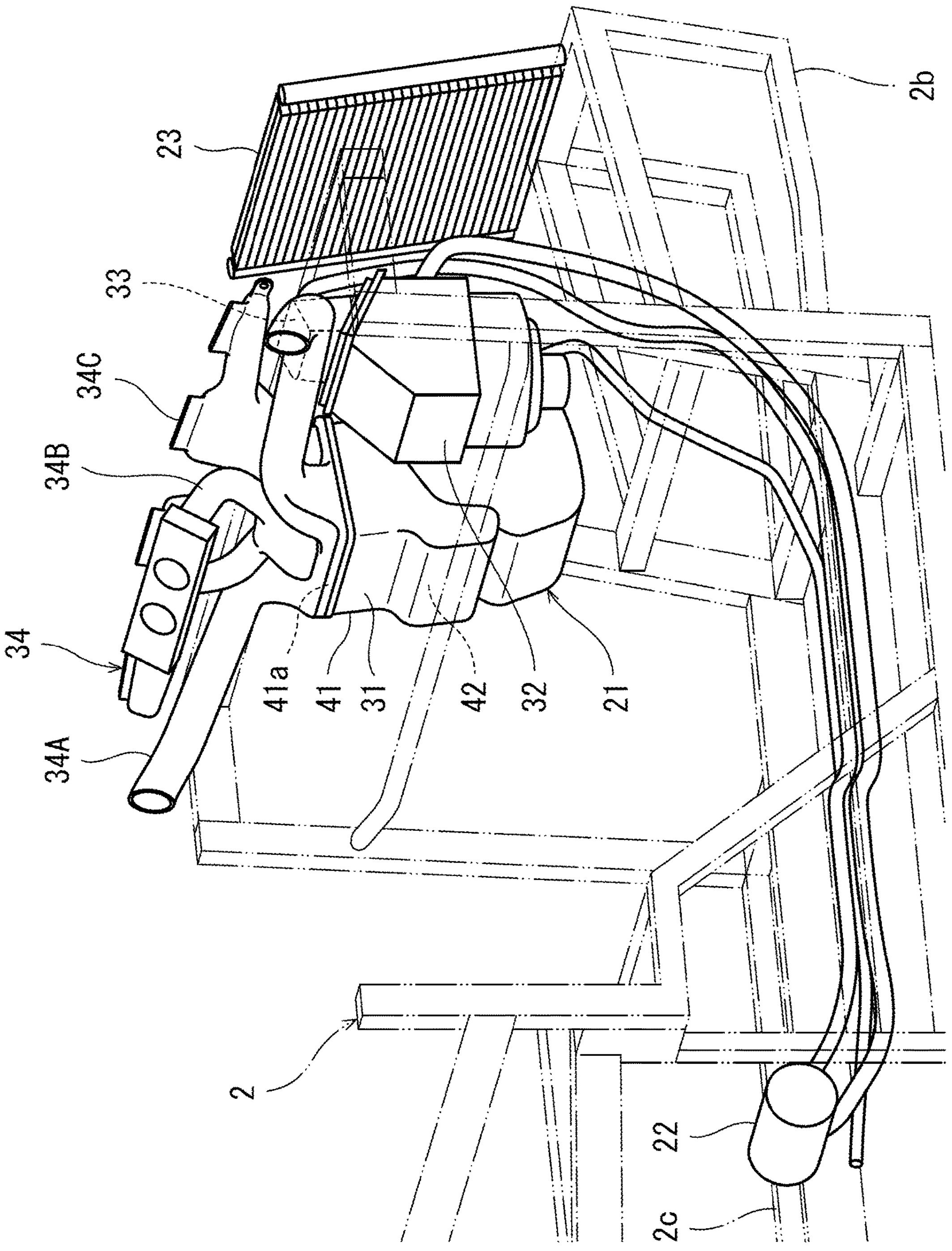
FIG. 3 is a perspective view of an air conditioner assembly of the vehicle of FIG. 1 when viewed from a rear right side.

FIG. 3 is a perspective view showing an air conditioner assembly 20 of the vehicle 1 of FIG. 1 when viewed from a rear right side. As shown in FIG. 3, the air conditioner assembly 20 includes the air conditioner 21, a compressor 22, and a condenser 23. As described above, the air conditioner 21 is located between the dash panel 10 and the dashboard 12. The compressor 22 is located behind the air conditioner 21 and is supported by a rear frame 2*c* of the vehicle body frame 2. The condenser 23 is located in front of the air conditioner 21 and in the front space FS (see FIG. 1) and is supported by a front frame 2*b* of the vehicle body frame 2.

A cooling medium that is a gas which has absorbed heat by a below-described heat exchanger 42 in the air conditioner 21 is sent to the compressor 22 through a pipe. The cooling medium which has been compressed by the compressor 22 becomes a high-temperature high-pressure gas and is sent to the condenser 23 through a pipe. The cooling medium which has been liquefied by the condenser 23 is sent to the air conditioner 21 and is vaporized by a vaporizer. In the air conditioner 21, the cooling medium which has become low in temperature by the vaporization flows through the heat exchanger 42 to cool the air that is in contact with the heat exchanger. Then, the air conditioner 21 sends the cooled air.

The air conditioner 21 includes a heat exchange segment 31, an air sending segment 32, an intake duct 33, and a discharge duct 34. A cooling medium inlet of the heat exchange segment 31 is connected to the condenser 23 through a pipe. A cooling medium outlet of the heat exchange segment 31 is connected to the compressor 22 through a pipe. The air sending segment 32 takes air from the outside of the vehicle through the intake duct 33 and sends the air toward the heat exchanger 42 of the heat exchange segment 31.

The heat exchange segment 31 includes a housing 41 and the heat exchanger 42 accommodated in the housing 41. The vaporizer is located on a passage extending from the condenser 23 to the heat exchanger 42. The vaporizer may be accommodated in the housing 41 of the heat exchange segment 31 or may be located upstream of the heat exchange segment 31. An outlet 41*a* through which the air having been cooled by the heat exchanger 42 flows out is located at an upper wall of the housing 41. The discharge duct 34 which communicates with the outlet 41*a* and through which the air having flowed out from the outlet 41*a* flows is fixed to the housing 41.

Specifically, the discharge duct 34 includes a first discharge duct 34A, a second discharge duct 34B, and a third discharge duct 34C. The first discharge duct 34A includes discharge ports which are directed toward the cabin space C through openings located at both side portions of the dashboard 12 in the vehicle left-right direction. The second discharge duct 34B includes discharge ports which are directed toward the cabin space C through openings located at a middle portion of the dashboard 12 in the vehicle left-right direction. The third discharge duct 34C includes discharge ports which are directed toward a windshield, which covers the cabin space C from the front side, through openings located at a front-side portion of the dashboard 12.

Figure 4:
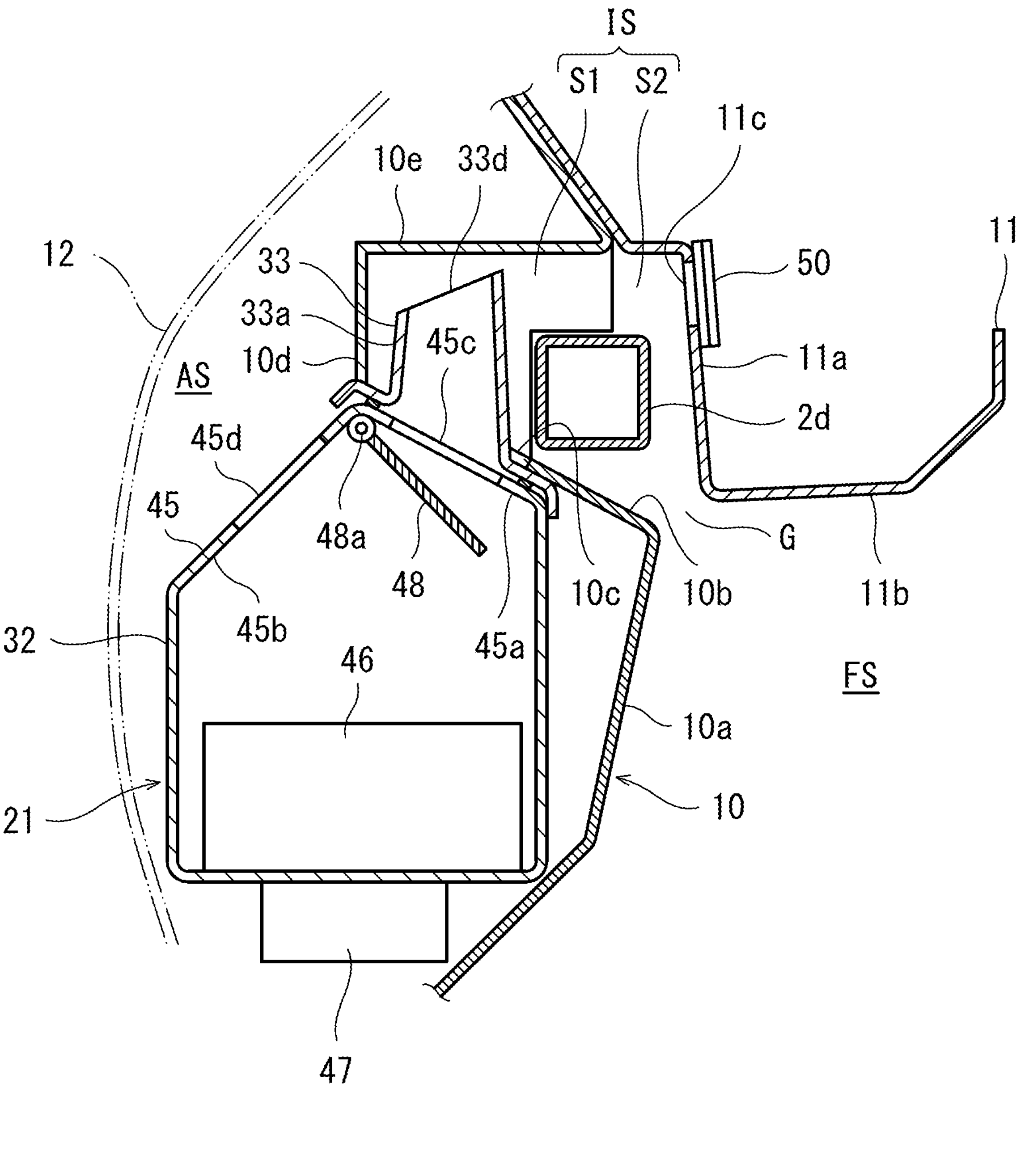
FIG. 4 is a sectional view showing an air conditioner of the vehicle of FIG. 3 and its vicinity when viewed from a lateral side.

FIG. 4 is a sectional view showing the air conditioner 21 of the vehicle 1 of FIG. 3 and its vicinity when viewed from the lateral side. As shown in FIG. 4, the air conditioner 21 is located in an accommodating space AS defined between the dash panel 10 and the dashboard 12. The air sending segment 32 of the air conditioner 21 includes a housing 45, a fan 46, an electric motor 47, and a switching plate 48.

An upper wall of the housing 45 includes: a front inclined wall 45*a* extending diagonally forward and downward; and a rear inclined wall 45*b* extending diagonally rearward and downward from an upper rear end of the front inclined wall 45*a*. The front inclined wall 45*a* includes an outside air inlet 45*c* through which the inside of the housing 45 is open to the outside. The outside air inlet 45*c* is an opening into which the air in the front space FS flows. The rear inclined wall 45*b* includes an inside air inlet 45*d* through which the inside of the housing 45 is open to the outside. The inside air inlet 45*d* is an opening into which the air in the cabin space C flows.

The switching plate 48 is accommodated in the housing 45. The switching plate 48 is connected to the housing 45 so as to be swingable by a pivot shaft 48*a* used as a fulcrum. The switching plate 48 is swingable between an indoor intake position where the switching plate 48 opens the inside air inlet 45*d* and closes the outside air inlet 45*c* and an outdoor intake position where the switching plate 48 opens the outside air inlet 45*c* and closes the inside air inlet 45*d*. The switching plate 48 swings in mechanical association with the movement of an operation knob which is located at the dashboard 12 and is operated by a user. The switching plate 48 may swing by being driven by an electric motor.

The fan 46 is accommodated in the housing 45. The fan 46 is, for example, a centrifugal fan. The electric motor 47 is connected to the fan 46 so as to drive the fan 46. The electric motor 47 may be located outside the housing 45 or may be located in an internal space of the housing 45. The fan 46 sucks the air from the outside of the housing 45 into the internal space of the housing 45 through at least one of the outside air inlet 45*c* and the inside air inlet 45*d* and sends the air toward the heat exchanger 42 of the heat exchange segment 31.

The dash panel 10 includes a first wall portion 10*a* and a second wall portion 10*b*. The first wall portion 10*a* covers the heat exchange segment 31 and air sending segment 32 of the air conditioner 21 from the front side. The second wall portion 10*b* extends rearward from an upper end of the first wall portion 10*a*. The second wall portion 10*b* extends in a direction along an upper surface of the front inclined wall 45*a* of the air sending segment 32. The second wall portion 10*b* includes an opening 10*c*. The intake duct 33 covers the front inclined wall 45*a* of the housing 45 from the upper side. The intake duct 33 projects upward from the housing 45. The intake duct 33 extends through the opening 10*c* of the dash panel 10 from the lower side to the upper side. An outside air suction port 33*d* of the intake duct 33 communicates with the front space FS.

The dash panel 10 further includes a third wall portion 10*d* and a fourth wall portion 10*e*. The third wall portion 10*d* covers the intake duct 33 from the rear side and the lateral sides. The fourth wall portion 10*e* projects forward from an upper end of the third wall portion 10*d*. The fourth wall portion 10*e* covers a tubular portion 33*a* of the intake duct 33 from the upper side so as to be spaced apart from the tubular portion 33*a*. The fourth wall portion 10*e* projects forward beyond the tubular portion 33*a* of the intake duct 33. A first space S1 surrounded by the second wall portion 10*b*, the third wall portion 10*d*, and the fourth wall portion 10*e* is open to the front side.

The front panel 11 covers, from the front side, the first space S1 that is defined by the dash panel 10 and is open to the front side. The front panel 11 includes a front wall portion 11*a* and a bottom wall portion 11*b*. The front wall portion 11*a* extends in a vertical direction so as to cover the first space S1 from the front side. The bottom wall portion 11*b* extends forward from a lower end of the front wall portion 11*a*. The bottom wall portion 11*b* of the front panel 11 is located higher than the first wall portion 10*a* of the dash panel 10. The front wall portion 11*a* of the front panel 11 is located away from the dash panel 10 toward the front side.

A second space S2 is defined between the front wall portion 11*a* and the dash panel 10. The first space S1 and the second space S2 constitute an intake space IS that is covered with the dash panel 10 from the rear side and is covered with the front panel 11 from the front side. A gap G through which the intake space IS communicates with the front space FS is located between the dash panel 10 and the front panel 11. The outside air suction port 33*d* of the intake duct 33 is located in the intake space IS. A cross frame 2*d* of the vehicle body frame 2 is located in the intake space IS and extends in the left-right direction. The cross frame 2*d* is located between the tubular portion 33*a* of the intake duct 33 and the front wall portion 11*a* of the front panel 11.

Figure 5:
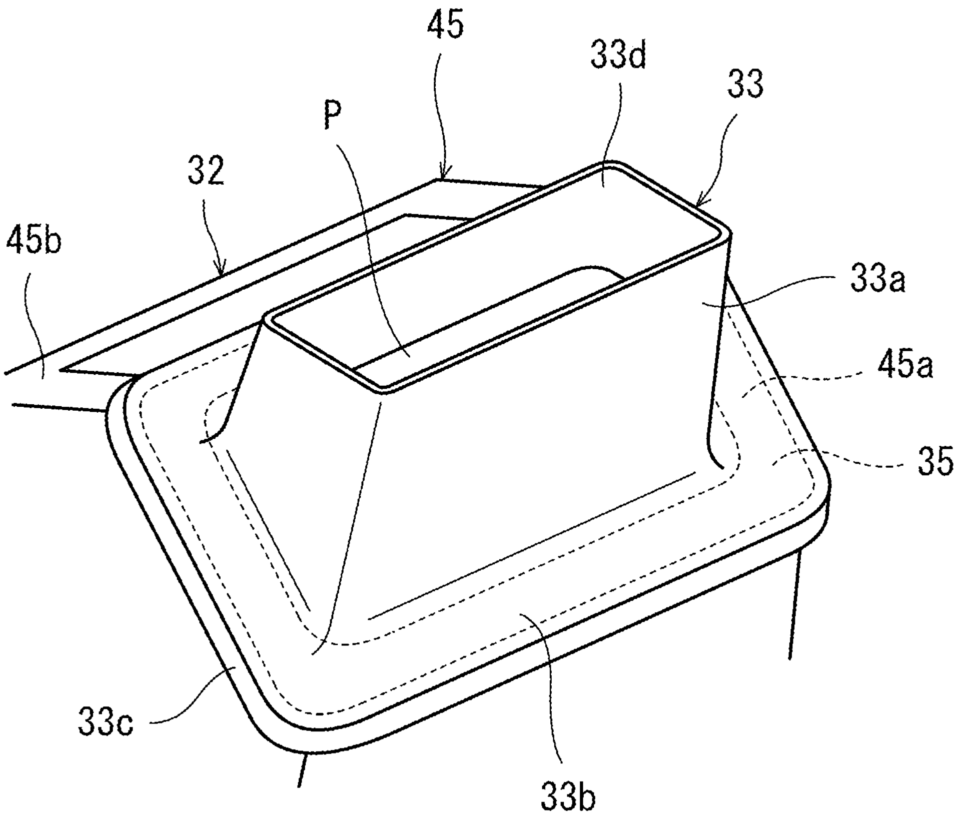
FIG. 5 is a perspective view showing an intake duct of FIG. 4 and its vicinity.

FIG. 5 is a perspective view showing the intake duct 33 of FIG. 4 and its vicinity. As shown in FIG. 5, the intake duct 33 includes the tubular portion 33*a*, a flange portion 33*b*, a water shielding wall portion 33*c*, and the outside air suction port 33*d*. The tubular portion 33*a* defines a passage P and extends upward in the vertical direction. The outside air suction port 33*d* is located at an upper end of the tubular portion 33*a* and in the first space S1 of the intake space IS. The passage P defined by the tubular portion 33*a* is open to the intake space IS through the outside air suction port 33*d*.

The flange portion 33*b* extends from a lower end of the tubular portion 33*a* along the front inclined wall 45*a* of the housing 45. To be specific, a passage axis of the tubular portion 33*a* extends in the vertical direction, whereas an upper surface of the flange portion 33*b* is inclined relative to a horizontal direction. The water shielding wall portion 33*c* projects downward from an outer peripheral end of the flange portion 33*b*. The water shielding wall portion 33*c* covers a peripheral end of the upper surface of the front inclined wall 45*a* of the housing 45 and projects downward beyond the peripheral end of the upper surface of the front inclined wall 45*a*. A circumferential seal 35 is sandwiched between the flange portion 33*b* of the intake duct 33 and the front inclined wall 45*a* of the housing 45. The seal 35 is located around the outside air inlet 45*c* of the housing 45 (see FIG. 6).

Figure 6:
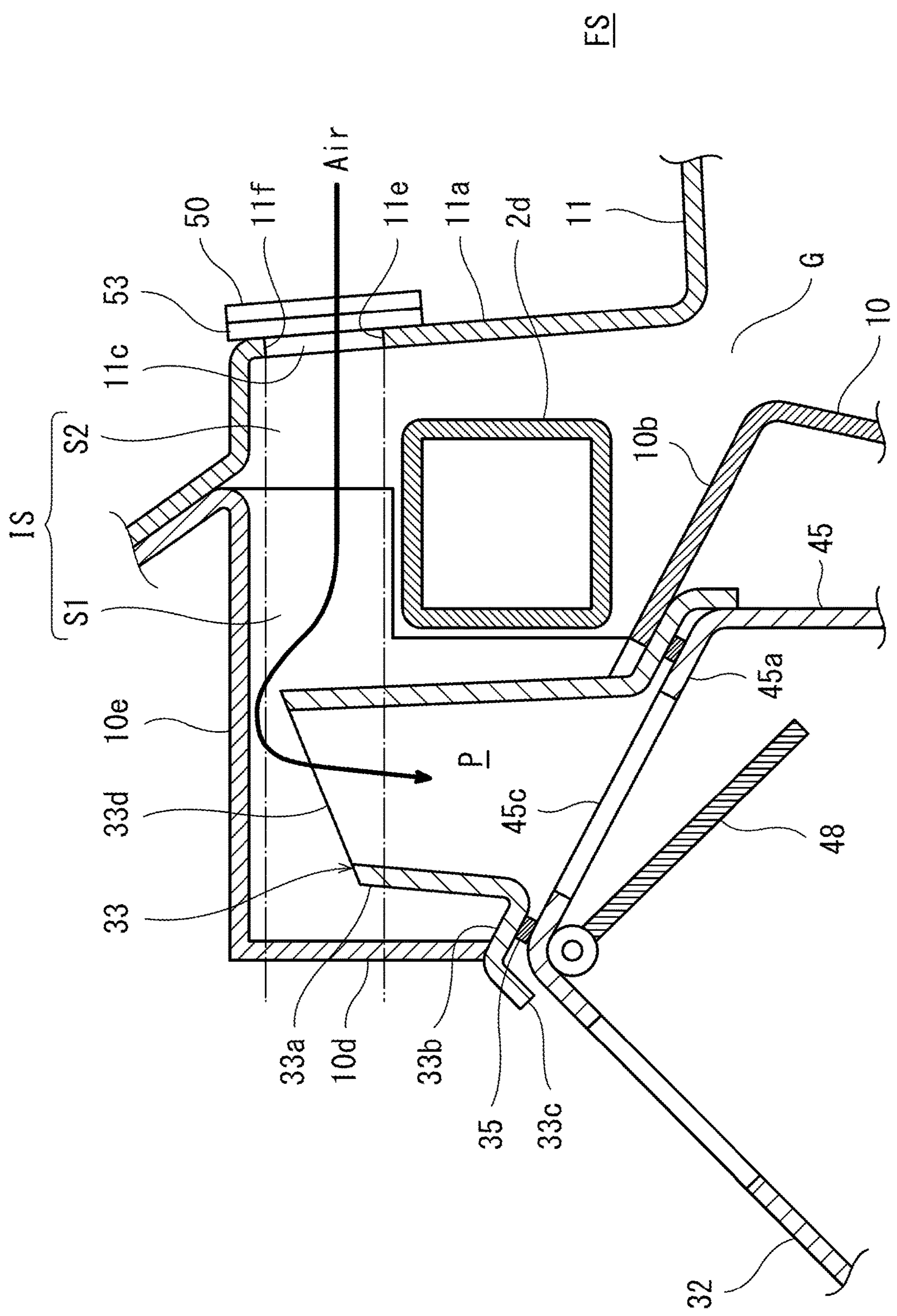
FIG. 6 is a sectional view showing the intake duct of FIG. 4 and its vicinity when viewed from the lateral side.

FIG. 6 is a sectional view showing the intake duct 33 of FIG. 4 and its vicinity when viewed from the lateral side. As shown in FIG. 6, the flange portion 33*b* of the intake duct 33 is pressed downward by the dash panel 10 such that the seal 35 is crushed. The intake duct 33 is not fixed to the housing 45 of the air sending segment 32. By removing the dash panel 10, the intake duct 33 can be detached from the housing 45. The intake duct 33 may be fixed or locked to the housing 45.

The tubular portion 33*a* of the intake duct 33 is located away from the front wall portion 11*a* of the front panel 11 toward the rear side. The front wall portion 11*a* of the front panel 11 includes a vent hole 11*c* which is located in front of the outside air suction port 33*d* of the intake duct 33. The vent hole 11*c* of the front panel 11 is opposed to the intake space IS in the vehicle front-rear direction. The vent hole 11*c* of the front panel 11 is covered with a filter 50 from the front space FS. A seal 53 that is located around the vent hole 11*c* is sandwiched between the front wall portion 11*a* of the front panel 11 and the filter 50.

The outside air suction port 33*d* of the intake duct 33 is directed in a direction away from the vent hole 11*c* of the front panel 11, i.e., is directed rearward. Specifically, the outside air suction port 33*d* of the intake duct 33 extends diagonally rearward and downward. To be specific, the upper end of the tubular portion 33*a* of the intake duct 33 extends diagonally rearward and downward. A front portion of the tubular portion 33*a* of the intake duct 33 is longer in the vertical direction than a rear portion of the tubular portion 33*a* of the intake duct 33.

An upper end of the outside air suction port 33*d* of the intake duct 33 is higher than a lower edge Ile of the vent hole 11*c* of the front panel 11. In the present embodiment, a lower end of the outside air suction port 33*d* of the intake duct 33 is also higher than the lower edge Ile of the vent hole 11*c* of the front panel 11. The lower end of the outside air suction port 33*d* of the intake duct 33 is lower than an upper edge 11*f* of the vent hole 11*c* of the front panel 11. In the present embodiment, the upper end of the outside air suction port 33*d* of the intake duct 33 is also lower than the upper edge 11*f* of the vent hole 11*c* of the front panel 11.

When negative pressure is transmitted to the passage P of the intake duct 33 through the outside air inlet 45*c* of the housing 45 by the driving of the fan 46 (see FIG. 4), the air in the front space FS flows into the intake space IS through the filter 50 and the vent hole 11*c* and is sucked into the passage P through the outside air suction port 33*d* of the intake duct 33.

The gap G through which the front space FS communicates with the intake space IS is located lower than the outside air suction port 33*d* of the intake duct 33. The gap G is located in front of and under the outside air suction port 33*d* of the intake duct 33. The cross frame 2*d* is located between the gap G and the outside air suction port 33*d* of the intake duct 33. The second wall portion 10*b* located right under the cross frame 2*d* extends diagonally forward and downward. Even when water having scattered in the front space FS gets into the intake space IS through the gap G, such water is bounced back by the cross frame 2*d* and returns to the front space FS along an upper surface of the second wall portion 10*b*.

Figure 7:
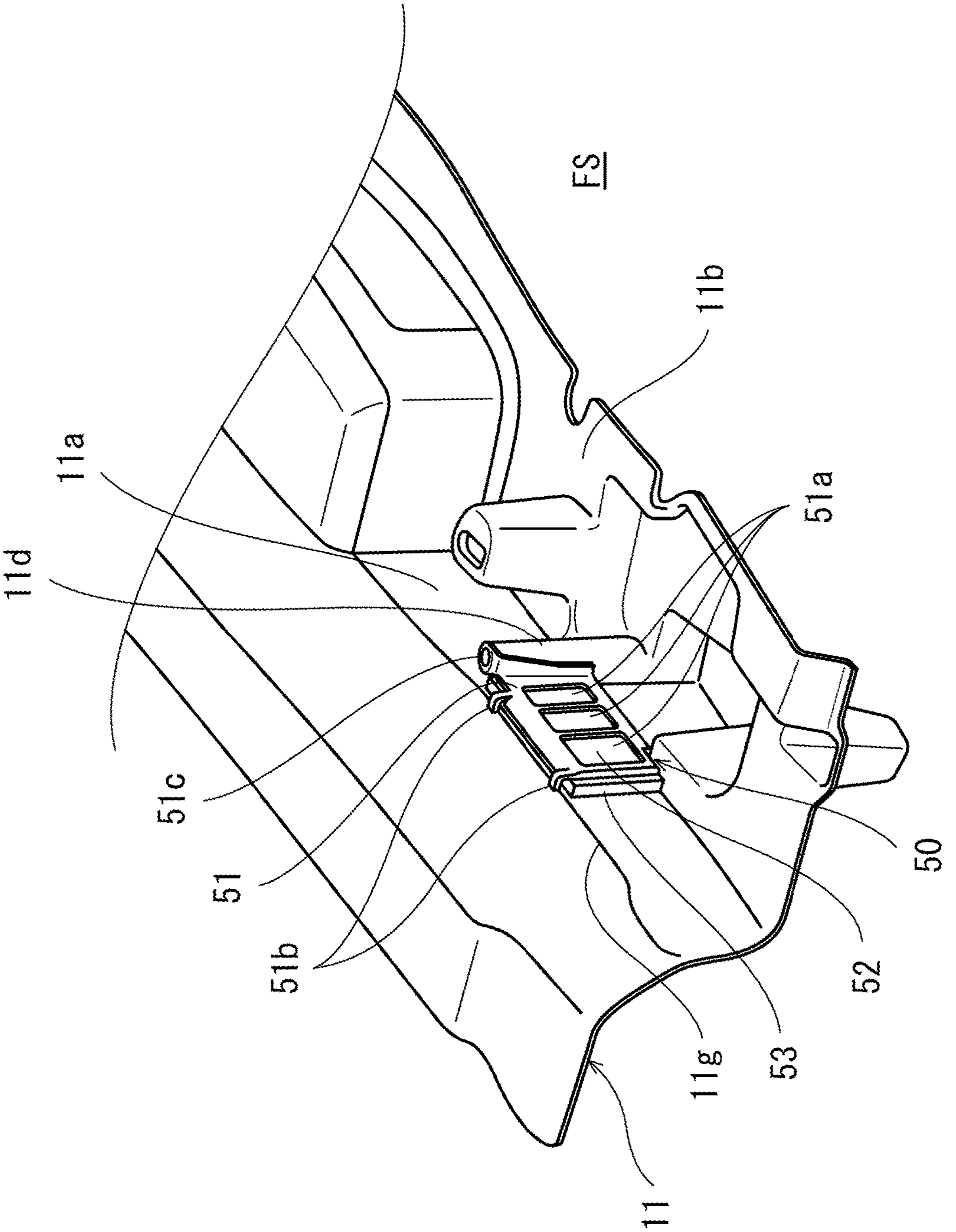
FIG. 7 is a perspective view showing a filter of FIG. 4 and its vicinity when viewed from a front right side.

FIG. 7 is a perspective view showing the filter 50 of FIG. 4 and its vicinity when viewed from a front right side. As shown in FIG. 7, the filter 50 covers the vent hole 11*c* (see FIG. 6) of the front panel 11 from the front space FS. The filter 50 is located at such a position that when the front cover 6 (see FIG. 2) is detached, the filter 50 is exposed to the outside of the vehicle. Specifically, when the front side cowl 16 is detached, the filter 50 is exposed to the outside of the vehicle, and the user at the outside of the vehicle can access the filter 50.

The filter 50 includes a filter frame 51 and a filter mesh 52. The filter frame 51 includes openings 51*a*, locking portions 51*b*, and a fixing portion 51*c*. The locking portions 51*b* are locked to a locked portion 11*g* of the front panel 11 from the upper side. For example, each locking portion 51*b* is a hook having an inverted U shape, and the locked portion 11*g* is a recess to which the hook is hooked. The fixing portion 51*c* is brought into contact with a boss 11*d* of the front panel 11 from the upper side and is fixed to the boss 11*d* by a fixture, such as a rivet or a screw, from the upper side. The openings 51*a* of the filter frame 51 overlap the vent hole 11*c* (see FIG. 6) of the front wall portion 11*a* of the front panel 11. The filter mesh 52 is attached to the filter frame 51 so as to close the openings 51*a*.

Figure 8:
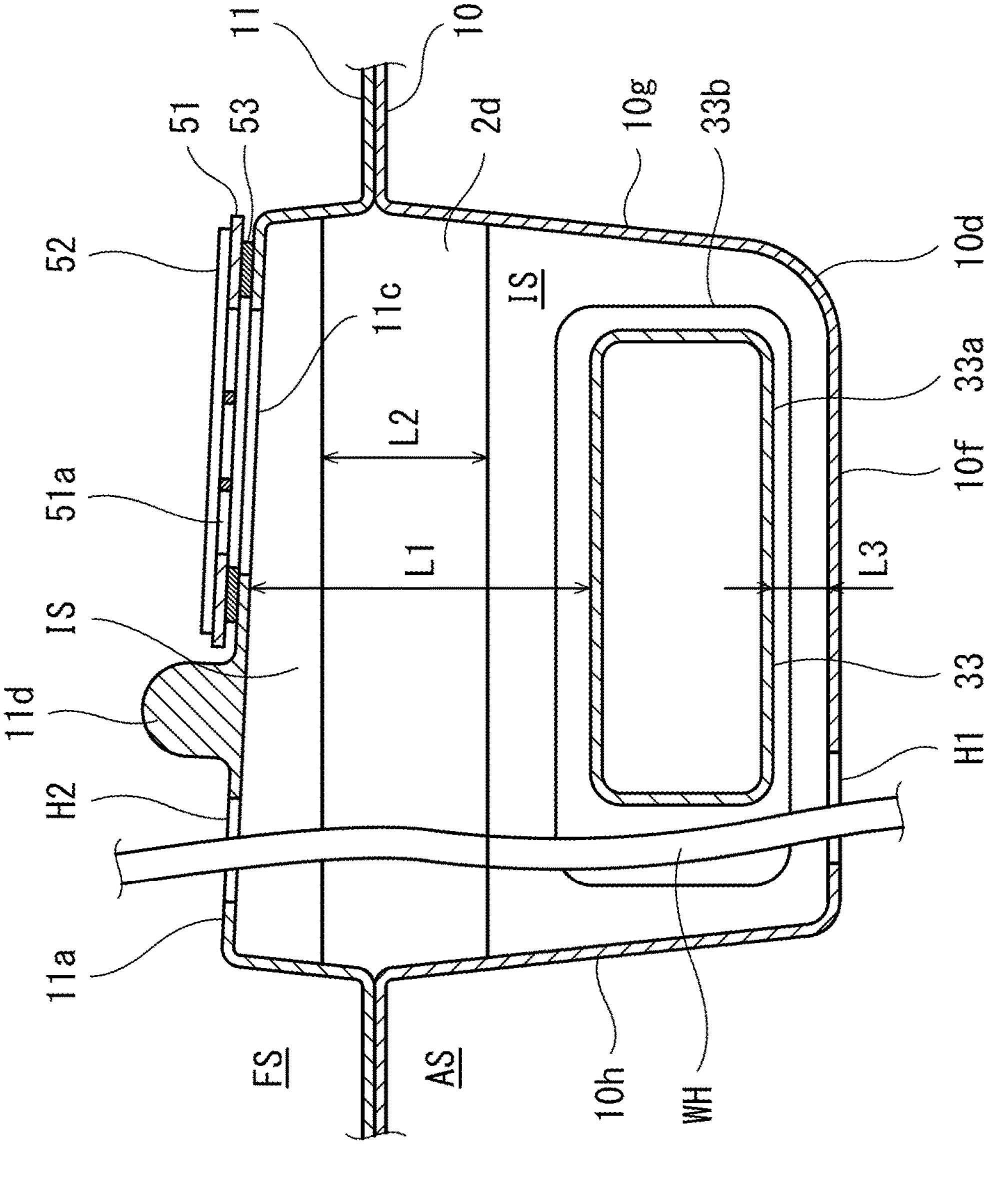
FIG. 8 is a horizontal sectional view showing the intake duct of FIG. 4 and its vicinity when viewed from an upper side.

FIG. 8 is a horizontal sectional view showing the intake duct 33 of FIG. 4 and its vicinity when viewed from the upper side. As shown in FIG. 8, the third wall portion 10*d* of the dash panel 10 includes: a rear wall portion 10*f* opposed to the intake duct 33 from a vehicle rear side; a right wall portion 10*g* opposed to the intake duct 33 from a vehicle right side; and a left wall portion 10*h* opposed to the intake duct 33 from a vehicle left side. A space surrounded by the rear wall portion 10*f*, the right wall portion 10*g*, the left wall portion 10*h*, and the front wall portion 11*a* constitutes the intake space IS. The tubular portion 33*a* of the intake duct 33 is located away from the rear wall portion 10*f*, the right wall portion 10*g*, and the left wall portion 10*h*. A distance L1 between the tubular portion 33*a* of the intake duct 33 and the front wall portion 11*a* of the front panel 11 in the vehicle front-rear direction is larger than a dimension L2 of the cross frame 2*d* in the vehicle front-rear direction. The distance L1 is larger than a distance L3 between the tubular portion 33*a* of the intake duct 33 and the rear wall portion 10*f* of the dash panel 10 in the vehicle front-rear direction.

The off-road vehicle 1 includes a wire harness WH extending from the accommodating space AS to the front space FS. The dash panel 10 includes a harness insertion hole H1 located at the rear wall portion 10*f* opposed to the intake duct 33 from the vehicle rear side. The front panel 11 includes a harness insertion hole H2 located at the front wall portion 11*a* opposed to the intake duct 33 from the vehicle front side. The wire harness WH is inserted into the harness insertion hole H1 of the dash panel 10 and the harness insertion hole H2 of the front panel 11. The wire harness WH extends in the vehicle front-rear direction in the intake space IS and extends through a region located at the lateral side of the intake duct 33. The fixing portion 51*c* of the filter frame 51 is located between the harness insertion hole H2 of the front panel 11 and the vent hole 11*c* of the front panel 11 in the vehicle left-right direction.

The harness insertion holes H1 and H2 are not completely sealed in a state where the wire harness WH is being inserted into the harness insertion holes H1 and H2. Nothing may be attached to the harness insertion holes H1 and H2. Rings that prevent the damage of the wire harness WH may be attached to the harness insertion holes H1 and H2. Curtain grommets that roughly close the harness insertion holes H1 and H2 may be attached to the harness insertion holes H1 and H2. Even when the water from the front space FS has flowed through the harness insertion hole H2 of the front panel 11, the water hardly reaches the harness insertion hole H1 of the dash panel 10. This is because the distance L1 is long.

According to the above-described configuration, the outside air suction port 33*d* of the air conditioner 21 is open in the intake space IS that is covered with the dash panel 10 from the rear side and is covered with the front panel 11 from the front side. Therefore, water and foreign matters are prevented from getting into the outside air suction port 23*d* of the air conditioner 21 by a simple configuration.

The outside air suction port 33*d* of the air conditioner 21 is a tip opening of the intake duct 33 including the passage P communicating with the outside air inlet 45*c* of the housing 45. Therefore, the position of the outside air suction port 33*d* can be easily determined by the intake duct 33.

The tubular portion 33*a* of the intake duct 33 is located away from the front panel 11 toward the rear side. Therefore, even when water reaches the intake space IS located inside the front panel 11, the water falls through the gap between the intake duct 33 and the front panel 11. Thus, the water can be prevented from entering the outside air suction port 33*d* of the intake duct 33.

The outside air suction port 33*d* of the intake duct 33 is directed in a direction away from the vent hole 11*c* of the front panel 11. Therefore, even when water has flowed through the vent hole 11*c* of the front panel 11, the water hardly enters the outside air suction port 33*d* of the intake duct 33.

The upper end of the outside air suction port 33*d* of the intake duct 33 is higher than the lower edge of the vent hole 11*c* of the front panel 11. Therefore, even when water has flowed through the vent hole 11*c* of the front panel 11, the water hardly enters the outside air suction port 33*d* of the intake duct 33.

The seal 35 located around the outside air inlet 45*c* is sandwiched between the housing 45 and the intake duct 33. Therefore, the water can be prevented from entering the outside air inlet 45*c* through a gap between the intake duct 33 and the housing 45.

The intake duct 33 is pressed toward the housing 45 by the dash panel 10 such that the seal 35 is crushed. Therefore, fixtures that fix the intake duct 33 to the housing 45 can be reduced or omitted.

The intake duct 33 includes the water shielding wall portion 33*c* projecting downward from the peripheral end of the flange portion 33*b*, and the water shielding wall portion 33*c* projects downward beyond the peripheral end of the upper surface of the front inclined wall 45*a* of the housing 45. Therefore, even when water adheres to an outer surface of the intake duct 33, the water does not reach the upper surface of the front inclined wall 45*a* of the housing 45. Thus, the water can be prevented from entering the gap between the intake duct 33 and the front inclined wall 45*a*.

The vent hole 11*c* of the front panel 11 is covered with the filter 50, and outside air in the front space FS flows through the filter 50 into the outside air suction port 33*d* of the intake duct 33. Therefore, the air conditioner 21 can smoothly suck the outside air while preventing water and foreign matters from entering the air conditioner 21.

The filter 50 is located at such a position that when the front side cowl 16 of the front cover 6 is detached, the filter 50 is exposed to the outside of the vehicle. Therefore, the maintenance of the filter 50 is easy.

The filter 50 includes the locking portions 51*b* which are locked to the front panel 11 from the upper side. Therefore, portions where the filter 50 is fixed to the front panel 11 can be reduced, and the filter 50 can be easily attached to and detached from the front panel 11.

The intake space IS where the intake duct 33 is located is utilized as a space through which the wire harness WH extends, and the harness insertion hole H1 of the dash panel 10 is located adequately away from the harness insertion hole H2 of the front panel 11 toward the vehicle rear side. Therefore, even when water from the front space FS has flowed through the harness insertion hole H2 of the front panel 11, the water hardly flows through the harness insertion hole H1 of the dash panel 10. Thus, members that seal the harness insertion holes H1 and H2 are unnecessary.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

What is claimed is:

1. An off-road vehicle comprising:
a vehicle body frame;
a cabin space where an occupant seat supported by the vehicle body frame is located;
a front cover covering, from an upper side, a front space located in front of the cabin space;
a dash panel separating the cabin space and the front space;
a dashboard located behind the dash panel and facing the occupant seat;
a front panel located in front of the dash panel, the front panel including a vent hole which is located under the front cover;
an air conditioner located in an accommodating space defined between the dash panel and the dashboard; and
a filter,
wherein:
an outside air suction port of the air conditioner is located in an intake space that is covered with the dash panel from a rear side and is covered with the front panel from a front side;
the vent hole is located forward of the outside air suction port, and
the filter covers the vent hole.

2. The off-road vehicle according to claim 1, wherein the air conditioner includes;
a housing including an outside air inlet, and
an intake duct including:
a passage communicating with the outside air inlet of the housing; and
the outside air suction port through which the passage is open to the intake space.

3. The off-road vehicle according to claim 2, wherein:
the intake duct includes a tubular portion that defines the passage; and
the tubular portion is located away from the front panel toward the rear side.

4. The off-road vehicle according to claim 2, wherein:
the front panel includes the vent hole located in front of the outside air suction port; and
the outside air suction port of the intake duct is directed in a direction away from the vent hole of the front panel.

5. The off-road vehicle according to claim 2, wherein:
the front panel includes the vent hole located in front of the outside air suction port;
the intake duct projects upward from the air conditioner; and
an upper end of the outside air suction port of the intake duct is higher than a lower edge of the vent hole of the front panel.

6. The off-road vehicle according to claim 2, wherein the air conditioner further includes:
a seal that is sandwiched between the housing and the intake duct and is located around the outside air inlet.

7. The off-road vehicle according to claim 6, wherein:
the intake duct is pressed toward the housing by the dash panel such that the seal is in a crushed state.

8. The off-road vehicle according to claim 2, wherein:
the housing includes a front inclined wall including the outside air inlet and extending diagonally toward a vehicle front side and a vehicle lower side;
the intake duct includes:
a tubular portion defining the passage and extending toward a vehicle upper side,
a flange portion extending from a lower end of the tubular portion along the front inclined wall, and
a water shielding wall portion projecting downward from a peripheral end of the flange portion; and
the water shielding wall portion of the intake duct projects downward beyond a peripheral end of an upper surface of the front inclined wall.

9. The off-road vehicle according to claim 2, further comprising:
a wire harness extending from the front space to the accommodating space,
wherein:
the dash panel includes:
a rear wall portion opposed to the intake duct from a vehicle rear side,
a right wall portion opposed to the intake duct from a vehicle right side, and
a left wall portion opposed to the intake duct from a vehicle left side;
the front panel includes a front wall portion opposed to the intake duct from a vehicle front side;
the rear wall portion of the dash panel includes a harness insertion hole;
the front wall portion of the front panel includes a harness insertion hole; and
the wire harness extends through the harness insertion hole of the dash panel and the harness insertion hole of the front panel and extends in a vehicle front-rear direction at a lateral side of the intake duct.

10. The off-road vehicle according to claim 9, wherein:
the filter includes:
a filter frame including an opening and a fixing portion fixed to the front panel; and
a filter mesh that is fixed to the filter frame so as to close the opening;
the front wall portion of the front panel includes the vent hole located in front of the outside air suction port; and
the fixing portion is located between the harness insertion hole of the front panel and the vent hole of the front panel in a vehicle left-right direction.

11. The off-road vehicle according to claim 1, wherein:
the filter covers the vent hole from the front space; and
the filter is located at such a position that when the front cover is at least partially detached, the filter is exposed to an outside of the vehicle.

12. The off-road vehicle according to claim 11, wherein the filter includes:
a filter frame including:
an opening,
a locking portion that is locked to the front panel from the upper side, and
a fixing portion that is fixed to the front panel; and
a filter mesh that is fixed to the filter frame so as to close the opening.

13. The off-road vehicle according to claim 1, further comprising:
a wire harness extending from the front space to the accommodating space,
wherein the wire harness extends through the intake space.

14. An off-road vehicle comprising:
a vehicle body frame;
a cabin space where an occupant seat supported by the vehicle body frame is located;

a front cover covering, from an upper side, a front space located in front of the cabin space;
a dash panel separating the cabin space and the front space;
a dashboard located behind the dash panel and facing the occupant seat;
a front panel located in front of the dash panel; and
an air conditioner located in an accommodating space defined between the dash panel and the dashboard, the air conditioner including:
a housing including an outside air inlet, and
an intake duct including:
a passage communicating with the outside air inlet of the housing; and
an outside air suction port through which the passage is open to an intake space,
wherein:
the front panel includes a vent hole which is located forward of the outside air suction port;
an end on a vehicle front side of the outside air suction port of the intake duct is higher in a vehicle vertical direction than an end on a vehicle rear side of the outside air suction port; and
the outside air suction port of the air conditioner is located in the intake space that is covered with the dash panel from a rear side and is covered with the front panel from a front side.

15. The off-road vehicle according to claim 14, wherein:
the front panel includes the vent hole which is located under the front cover.

16. The off-road vehicle according to claim 14, further comprising:
a filter that covers the vent hole.

17. The off-road vehicle according to claim 14, further comprising:
a wire harness extending from the front space to the accommodating space,
wherein the wire harness extends through the intake space.

18. An off-road vehicle comprising:
a vehicle body frame;
a cabin space where an occupant seat supported by the vehicle body frame is located;
a front cover covering, from an upper side, a front space located in front of the cabin space;
a dash panel separating the cabin space and the front space;
a dashboard located behind the dash panel and facing the occupant seat;
a front panel located in front of the dash panel; and
an air conditioner located in an accommodating space defined between the dash panel and the dashboard, the air conditioner including:
a housing including an outside air inlet,
an intake duct including:
a passage communicating with the outside air inlet of the housing; and
an outside air suction port through which the passage is open to an intake space; and
a seal that is sandwiched between the housing and the intake duct and is located around the outside air inlet,
wherein the outside air suction port of the air conditioner is located in the intake space that is covered with the dash panel from a rear side and is covered with the front panel from a front side.

19. An off-road vehicle comprising:
a vehicle body frame;
a cabin space where an occupant seat supported by the vehicle body frame is located;
a front cover covering, from an upper side, a front space located in front of the cabin space;
a dash panel separating the cabin space and the front space;
a dashboard located behind the dash panel and facing the occupant seat;
a front panel located in front of the dash panel; and
an air conditioner located in an accommodating space defined between the dash panel and the dashboard, the air conditioner including:
a housing including a front inclined wall that includes an outside air inlet and extends diagonally toward a vehicle front side and a vehicle lower side, and
an intake duct including:
a passage communicating with the outside air inlet of the housing;
an outside air suction port through which the passage is open to an intake space;
a tubular portion defining the passage and extending toward a vehicle upper side,
a flange portion extending from a lower end of the tubular portion along the front inclined wall; and
a water shielding wall portion projecting downward from a peripheral end of the flange portion, the water shielding wall portion of the intake duct projecting downward beyond a peripheral end of an upper surface of the front inclined wall,
wherein the outside air suction port of the air conditioner is located in the intake space that is covered with the dash panel from a rear side and is covered with the front panel from a front side.

* * * * *